Patented June 18, 1929.

1,717,424

UNITED STATES PATENT OFFICE.

OTTO VON SCHICKH, OF BERLIN, GERMANY, ASSIGNOR TO THE FIRM SCHERING-KAHLBAUM AKTIENGESELLSCHAFT.

CHEMICAL COMPOUND AND METHOD OF MAKING SAME.

No Drawing. Application filed February 28, 1928, Serial No. 257,788, and in Germany March 9, 1927.

My invention refers to halogen-acylized diphenyl ethers and to the method of producing same, these ethers being intended for use as starting materials for a number of products having a great therapeutical value.

It is known that by acting with acetyl chloride or benzoyl chloride on diphenyl ether, phenoxy acetaphenone and phenoxy benzophenone, respectively, are obtained (Berichte vol. 38, p. 2492). I have now found that, if operating under suitable conditions, also the ω-halogenated phenoxy acetophenones and their substitution products can be obtained by the action of halogenated acyl halogenides. The production of these compounds is the more astonishing as according to the reference cited above, acetyl chloride and diphenyl ether, on reacting with each other, will be converted only into phenoxy acetophenone, while if halogenated acyl chlorides are used, mainly diacylized diphenyl ethers are formed, while the monoacylized compounds are obtained only if operating under certain conditions.

The new compounds are colorless and insoluble in water; in the ordinary organic solvents they dissolve with difficulty in the cold and more readily at a higher temperature. They can easily be recrystallized from benzene or alcohol. The ω-halogen atoms can easily be substituted by $NH_3$ or amines, and the substances thus obtained have a high therapeutic efficiency.

Example 1.

To 23 grams of finely powdered aluminium chloride is added at ordinary temperature drop by drop a mixture of 10 grams diphenyl ether and 10 grams chloroacetyl chloride. The aluminium chloride double compound resulting in the reaction is decomposed with ice and the precipitating resin is recrystallized from alcohol. The new compound is a dichloroacetylized diphenyl ether melting at 102° C. The reaction occurs according to the formula:

$C_6H_5.O.C_6H_5 + 2Cl.CO.CH_2Cl =$
$ClCH_2.CO.C_6H_4.O.C_6H_4.CO.CH_2Cl + 2HCl.$

Example 2.

To 23 grams of finely powdered aluminium bromide is added drop by drop at ordinary temperature a mixture of 10 grams diphenyl ether and 13,8 grams bromoacetyl chloride. The product of reaction is decomposed with ice and the precipitating resin is recrystallized from alcohol. The resulting compound is a bibromoacetylized diphenyl ether having the form of a gray crystalline powder, melting at 121° C. The reaction occurs according to the formula:

$C_6H_5.O.C_6H_5 + 2Cl.CO.CH_2Br =$
$BrCH_2.CO.C_6H_4.O.C_6H_4.CO.CH_2Br + 2HCl.$

Example 3.

10 grams o-methoxydiphenyl ether are mixed with 10 grams aluminium chloride and to the mixture are added at ordinary temperature 8.5 grams chloroacetyl chloride. The aluminium chloride double compound is decomposed as described above and the bichloroacetylized o-methoxy dipenyl ether thus obtained, which melts at 148° C. is converted by saponification with aluminium chloride in an inert solvent followed by decomposition of the reaction product with ice and recrystallization from dilute alcohol into the corresponding oxy-compound in which $O.CH_3$ is replaced by OH, and which forms small white needles melting at 158° C. If methyl amine is caused to act on this compound, there results the corresponding amine, the hydrochloride of which forms a colorless crystalline powder readily soluble in water. The reaction occurs according to the formula

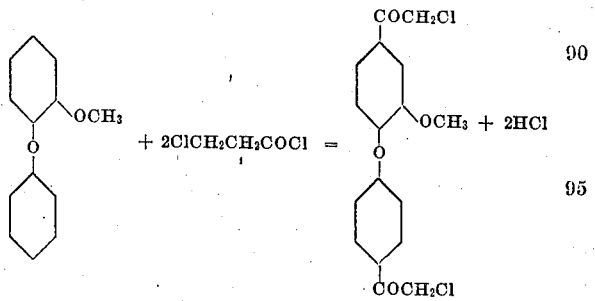

Example 4.

To 20 grams of finely powdered aluminium chloride is added at ordinary temperature and drop by drop a mixture of 10 grams p-methoxydiphenyl ether and 9 grams chloroacetyl chloride. The product of reaction is decomposed with ice and the precipitating resin is recrystallized from alcohol. There is obtained bichloroacetyl-p-oxydiphenyl ether having the form of small white needles melting at 155° C. The reaction occurs according to the formula

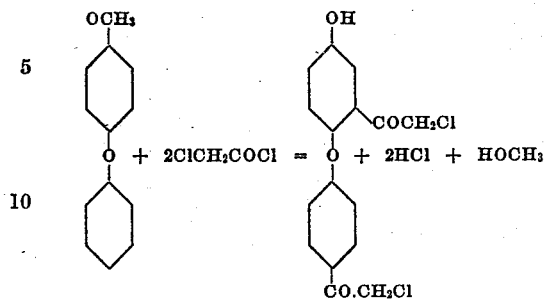

*Example 5.*

To a mixture of 12 grams aluminium chloride and 10 grams o-o'methoxy diphenyl ether 10 grams chloroacetyl chloride are added drop by drop at ordinary temperature. The product of reaction is decomposed with ice and the precipitate is recrystallized from benzene. The compound is a dichloroacetylized o-o'methoxydiphenyl ether having the formula

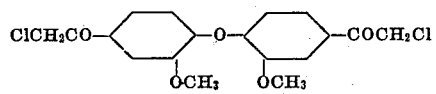

and crystallizing in the form of colorless prisms melting at 154° C., being insoluble in water and soluble in hot organic solvents such as benzene and alcohol.

Various changes may be made in the details disclosed in the foregoing specification without departing from the invention or sacrificing the advantages thereof.

In the claims "diphenyl ether" is intended to include the substitution products.

I claim:—
1. As new products the halogenacylized diphenyl ethers having the formula

$$YR.CO.(C_6X_4).O.(C_6X_4).CO.RY$$

wherein Y is a halogen atom, R an aliphatic radical, and $(C_6X_4)$ a benzene nucleus, in which X is intended to represent either hydrogen atoms or any desired univalent substituents; these compounds being colorless substances insoluble in water, more readily soluble in organic solvents, crystallizing readily and having a neutral reaction, the halogen atoms in the side chains being readily exchangeable against ammonia or amines.

2. As new compounds the halogen acylized diphenyl ethers having the formula $$Y.CH_2.CO.(C_6X_4).O.(C_6X_4).CO.CH_2Y$$

in which Y is a halogen atom and $(C_6X_4)$ a benzene nucleus in which X is intended to represent either hydrogen atoms or any desired univalent substituents, these compounds being colorless substances insoluble in water, more readily soluble in organic solvents, crystallizing readily and having a neutral reaction, the halogen atoms in the side chain being readily exchangeable against ammonia or amines.

3. As a new compound, dichloro acylized o-o'methoxy diphenyl ether having the formula

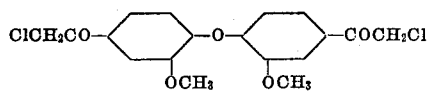

In testimony whereof I affix my signature.
OTTO von SCHICKH.